United States Patent Office 3,411,297
Patented Nov. 19, 1968

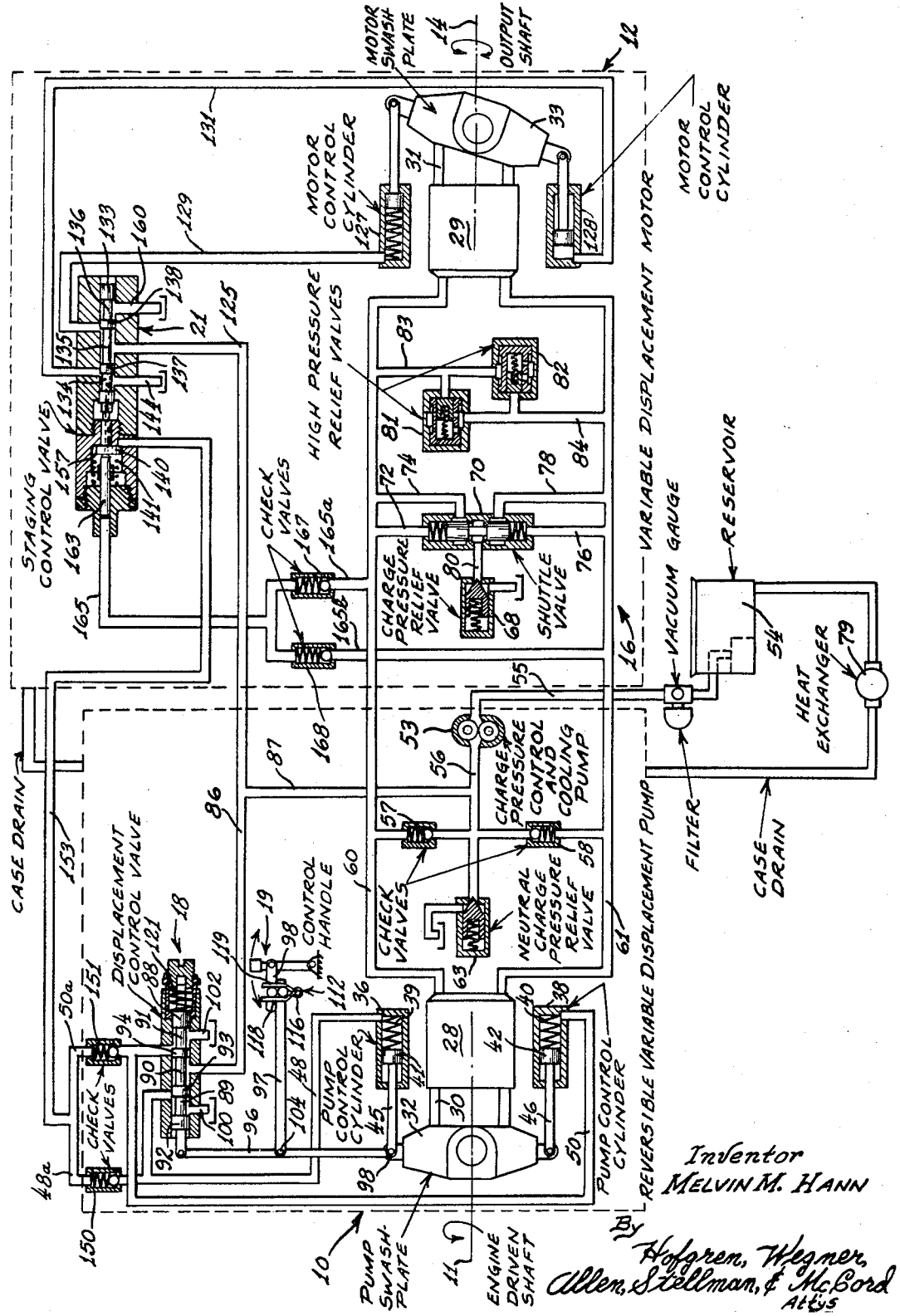

3,411,297
HYDROSTATIC TRANSMISSION
Melvin M. Hann, La Salle, Ill., assignor to Sundstrand Corporation, a corporation of Delaware
Filed Mar. 20, 1967, Ser. No. 624,538
10 Claims. (Cl. 60—53)

ABSTRACT OF THE DISCLOSURE

A hydrostatic transmission of the type comprising a variable displacement pump and a variable displacement motor including a staging valve for reducing the displacement of the motor after the pump reaches maximum displacement by sensing an increase in fluid pressure in a control motor which controls the pump displacement.

Background of the invention

Hydrostatic transmissions of the type to which the present invention relates are particularly usfeul in applications where precise displacement control of the transmission is required in a low speed range and a constant horsepower control is desired in a high speed range. Such applications include the propelling drives for lift trucks, the drive for effecting the swing function of a crane, the drive for the cable drum on a winch, and many other similar applications.

Summary of the invention

In accordance with the present invention, a displacement control is provided for staging the pump and the motor so that the displacement of the pump is increased to a maximum with the motor in its maximum displacement-maximum torque state and thereafter reducing the displacement of the motor to effect a further increase in the output speed of the transmission. A torque multiplication control is provided, which after the displacement of the motor is decreased will increase the displacement of the motor when the hydraulic system pressure exceeds a predetermined value and will increase the displacement until the torque capacity thereof reduces the system pressure to the predetermined value.

A manually positionable displacement control valve is provided for porting control fluid under pressure to pump control cylinders connected to a swashplate or cam in the pump for positioning the cam as desired, and a staging control valve which maintains a motor swashplate or cam in a maximum displacement position until the pump cam reaches its maximum position, and which in response to a build-up of control fluid pressure at the pump (indicating the pump control cylinders are at their end of stroke) reduces the displacement of the variable displacement motor. The staging control serves the above function and also as a torque multiplication valve for selectively increasing the displacement of the motor when the pressure in the conduits between the pump and the motor exceeds a predetermined value in a manner providing a constant horsepower control in an upper speed range of the transmission.

Description of the drawing

The accompanying drawing is a schematic illustration of the present hydrostatic transmission.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Description of the preferred embodiment

Referring in more detail to the drawing, the present transmission is seen to consist generally of a reversible variable displacement pump 10 driven by a prime mover (not shown) through a shaft represented schematically at 11, a variable displacement motor 12 connected to drive an output shaft indicated schematically at 14 and a closed hydraulic circuit 16 interconnecting the pump and motor. A displacement control valve 18 controlled by a manually operable handle 19 selects the desired displacement of the pump 10, and a staging control valve 21 serves the plural function of reducing the displacement nf the motor when the pump reaches its maximum displacement and increasing the displacement of the motor when system pressure in the circuit 16 exceeds a predetermined value to maintain a constant horsepower in the upper speed range of the transmission.

Preferably both the pump and motor are of the axial piston type having rotatable cylinder blocks 28 and 29 respectively, each with a plurality of cylinders in annular array and pistons 30 and 31, respectively, having ends reciprocable in the cylinders. The pump 10 has a variable angle reversible swashplate 32 engaged by the projecting ends of the pistons 30 for controlling the speed of the transmission as well as the direction of rotation thereof. The motor has a variable angle swashplate or cam 33 movable from a maximum displacement position shown to a minimum displacement position somewhat greater than zero. Cam 33 engages pistons 31 causing reciprocation thereof and rotation of the cylinder block 29 and output shaft 14 as high pressure fluid is supplied to the motor.

For positioning the pump swashplate or cam 32, two pump control cylinders 36 and 38 are provided, each housing a centering spring 39, 40 acting against pistons 41 and 42, respectively. The pitons 41 and 42 pivot the cam 32 through rods 45 and 46 rigidly connected to the pistons and pivotally connected to the cam. The control cylinders 36 and 38 position the cam in response to the supply of control fluid to the cylinders by means of conduits 48 and 50, respectively. The centering springs 39 and 40 normally act through the pistons to position the pump swashplate as shown in its neutral position when no control flow is delivered through conduits 48 or 50 so that there is no positive output from the pump. The control cylinders are a conventional single action type so that the influx of fluid under pressure in one cylinder will cause the swashplate to tilt or pivot in one direction, and the influx of fluid under pressure in the opposite cylinder will cause reverse pivoting of the cam thus permitting the flow from the pump 10 to reverse and consequently the output shaft 14 to be reversely rotated.

A positive displacement replenishing and cooling gear pump 53 is provided and is driven through suitable means by the engine or prime mover for the transmission. The pump 53 is in communicaton with a reservoir 54 through an intake conduit 55 for supplying replenishing and cooling fluid to the system through the replenishing and cooling conduit 56. The capacity of pump 53 is sufficient to replace leakage fluid, to supply control fluid to the valves 18 and 21, and to supply cooling fluid to the circuit 16 in excess of that required for the aforementioned purposes in order to maintain the transmission cool. Furthermore, the pump 53 is sized with respect to the valve 18, so that when valve 18 is open porting fluid to one of the control cylinders 36, 38, the pump 53 may develop a pressure in excess of that required to maintain the pump cam 32 in its maximum displacement position. For example, if the pressure in the cylinders 36 and 38 required to maintain the cam 32 in its maximum displacement position is 125 p.s.i., the charge pump might be sized to deliver control fluid under a charge pressure of 200 p.s.i. The significance of this will appear hereinafter with respect to the present staging control.

A pair of spring biased check valves 57 and 58 are in communication with the conduit 56 and with main conduits 60 and 61, respectively, interconnecting the pump and the motor. Check valves 57 and 58 permit the supply of replenishing and cooling fluid to the low pressure side of the circuit 16 through one check valve while pressure in the high pressure conduit will maintain the other check valve closed. A spring biased make-up relief valve 63 communicates with the conduit 56 and serves to relieve excess fluid.

For establishing a circuit between the main line 60 or 61 that is at low pressure and a low pressure relief valve 68 a shuttle valve 70 is provided. The shuttle valve is in communication with the conduits 60 and 61 by means of the conduits 72, 74, 76 and 78, and provides a means for removing heated oil displaced by cooling oil supplied by replenishing pump 53. The fluid pressure in the conduits 60 and 61 acts through the conduits 72 and 76, respectively, to appropriately position the shuttle valve so that communication is established from the low pressure relief valve through a conduit 80 to the low pressure side of the transmission circuit, by means of either the conduit 74 or the conduit 78 so that the heated fluid may be drained to the reservoir therefrom, passing through the heat exchanger 79. Shuttle valve 70 is spring centered to a closed position so that during the transition of reversing of pressure in the main lines none of the high pressure oil is lost from the circuit.

The transmission includes over pressure relief valves 81 and 82 in communication with each of the main lines of the conduits 83 and 84. The valves serve to prevent abnormally high pressure in either of the two main hydraulic lines 60 and 61 by relieving the circuit of surge pressures which may occur during rapid acceleration or abrupt braking. In response to this high pressure the over pressure relief valves shift to dump the excess oil to the low pressure side of the transmission circuit. For example, when excessive high pressure exists in line 60, fluid pressure in conduit 83 will cause valve 81 to shunt the fluid to line 61 through conduit 84.

The control unit for the transmission includes displacement control valve 18 and control handle 19 which appropriately positions the valve. The control handle assembly is provided with conventional frictional retention means for maintaining the handle in any preselected position to which it is manually moved. The control valve 18 is a spring centered four-way valve in communication with control fluid through conduits 86 and 87. The valve includes a valve stem 88 having reduced diameter portions 89, 90 and 91 defining lands 92, 93 and 94 thereon. The valve stem is operatively associated with the control handle through links 96, 97 and 98. Link 96 is also operatively connected at its other end to the cam 32 as shown at 98. The control handle link 97 is pivotally connected to link 96 intermediate the cam and valve stem connections so that movement of the control handle will appropriately position the valve stem for metering fluid through the valve to the pump control motors as desired.

As shown, the control valve 18 is in a neutral or centered position so that control fluid from pump 53 by way of conduits 87 and 86 enters the valve, and while capable of flowing around the reduced diameter portion 90 of the valve stem 88 it is blocked by lands 93 and 94 from passing out of the valve through either the conduit 48 or 50 so that no fluid may be supplied to the pump control cylinder. However, the conduits 48 and 50 from the pump control cylinders are in communication with drain conduits 100 and 102 by way of the valve stem reduced portions 89 and 91, respectively.

Movement of the handle 19 imparts the desired directional movement to the transmission. If, for example, the control handle is moved to the left the links 98 and 97 will also move to the left, pivoting link 96 about point 98, moving the valve stem 88 to the left. As the valve stem moves to the left communication is established around the reduced portion 90 between conduit 86 and conduit 48 supplying control fluid to the pump control cylinder 36 causing the pump swashplate to pivot in a counterclockwise direction. The pump control cylinder 38 remains connected to drain 102 through the conduit 50 and reduced portion 91.

As the swashplate tilts in a counterclockwise direction, the link 96 pivots clockwise about pivot 104 (which is then stationary due to the frictional retention of the control handle 19 in a selected position) and creates a feedback signal to the valve stem 88 causing the stem to be returned to the right toward the neutral position. As the valve stem moves to the right, the flow of control fluid to the cylinder 36 will be reduced and blocked by the valve stem, thus shutting off supply of additional control fluid to the pump control cylinder 36. The termination of the supply of control fluid to the cylinder also terminates the further movement of the swashplate thereby halting further movement of the valve stem. Thus, the valve achieves a closed position blocking the flow of control fluid to or from the control cylinder which is acting to displace the swashplate so that further swashplate displacement in either direction is prevented. Handle 19 remains in the position to which it has been moved until it is moved again by the operator. When the swashplate overshoots, the feedback signal to the valve stem calls for adjustment of the swashplate to correctly position it. Upon returning the control handle 19 to neutral, valve stem 88 is moved so that communication is established between the conduit 48 and drain conduit 100 by reduced portion 89, draining the control fluid from the cylinder 36 while control fluid is supplied to cylinder 38 through reduced portion 90 to return the swashplate to an upright or neutral position as shown in the drawing.

For a purpose described in more detail below, the range of movement of the control handle 19, the linkage associated therewith, and the valve stem 88 is selected so that it is somewhat greater than necessary to move the cam 32 to its maximum displacement position on either side of neutral. Thus, after the pump cam 32 reaches one of its maximum displacement positions, further movement of the control handle 19 and valve 88 in a displacement increasing direction will serve to open one of the lines 48 or 50 more fully to control fluid thus increasing the pressure in these lines, and as the pump cam cannot be moved to a greater displacement position, there will be no feedback signal through link 96 to the valve stem and valve 88 will remain open.

It should be noted that there is a yieldable connection between the control handle and the valve member so that excess forces applied to the control handle will not be transmitted to the valve member. In particular, the yieldable connection indicated generally at 112 is between the control handle link 97 and link 98. A coiled torsion spring 116 has outwardly projecting terminal fingers 118 and 119 at the opposite ends thereof tending to move toward each other and which may be moved apart upon a predetermined force. The spring fingers 118 and 119 normally constrain the links 97 and 98 to move together as a unit. The torsion strength of spring 116 is such that if the handle 19 is moved sufficiently to jam the valve stem 88 to the limit of its permissible movement, the spring will yield in response to the opposition offered by the valve stem so that the handle movement is not transmitted directly to the valve member. Thus, rather than permit the excess of force to be transmitted to the valve stem where it may cause damage thereto, such excess force is absorbed by the spring 116.

Furthermore, the valve 18 has a neutral spring assembly 121 which provides accurate centering for the valve stem 88 when in its neutral position and compensates for any backlash in the linkages associated therewith.

The staging control valve 21 serves to selectively port fluid from control fluid conduit 125 to motor control cylinders 127 and 128 which are similar to pump control cylinders 36 and 38. Rather than employing a neutral centering spring in each control cylinder, only one spring is provided in cylinder 127 so that the motor cam is normally biased to its maximum displacement position even in the absence of control fluid pressure. Line 129 connects control motor 127 with the valve 21 and line 131 connects control motor 128 to valve 21.

The valve 21 includes a valve stem 133 having reduced portions 134, 135 and 136 defining lands 137 and 138 thereon. Formed near the left end of the valve 133 is a piston 140 which engages a stepped portion of the valve bore limiting the rightward movement of the valve stem from the position shown, which is the lower speed range position. A compression spring 141 seated in the valve housing engages the piston 140 and biases the valve stem 133 to its position shown in the drawing. In the low speed position shown, the valve lands 137 and 138 are positioned such that line 131 communicates with tank through line 144 depressurizing control cylinder 128, and line 129 communicates with control fluid line 125 across reduced stem portion 135 pressurizing control cylinder 127 and moving the cam 33 to its maximum displacement position. Thus, in the low speed range of the transmission, the motor is maintained at maximum displacement.

The valve 21 serves to reduce the displacement of the motor 12 after the pump 10 has reached its maximum displacement on either side of neutral. Valve 21 accomplishes this by sensing a fluid pressure in one of the conduits 48 and 50 in excess of that required to hold the pump cam 32 in its maximum displacement position. That is, so long as the pump is at a displacement less than maximum, the pressure in conduits 48 and 50 will necessarily be below the predetermined value necessary to hold the pump cam in its maximum displacement position. If the pressure in lines 48 and 50 exceeds this predetermined value it indicates the pump cam has reached the maximum displacement position. As described above, the control handle 19 and the valve stem 88 may be moved beyond the position necessary to achieve maximum pump displacement so that this pressure rise in the conduits 48 and 50 may occur.

To accomplish this, a pair of check valves 150 and 151 are provided in branch conduits 48a and 50a. These branch passages both connect with a pressure signal line 153 communicating with a valve chamber 157 defined in the valve 21 adjacent one side of the piston 140. The force of fluid flowing in line 153 and acting on the right side of piston 140 serves to move the valve stem 133 to the left against the biasing force of spring 141. The spring 141 and the check valves 150 and 151 are selected such that the valve stem 133 will move to the left when the pressure either in line 48 or 50 exceeds that required to hold the pump cam 32 in its maximum displacement position.

When the valve stem 133 moves to the left from its normal or low speed position shown; land 138 will communicate line 129 to tank through passage 160 depressurizing motor control cylinder 127, and land 137 will connect line 131 with control fluid line 125 pressurizing control motor 128, thus pivoting the motor swashplate in a counterclockwise direction reducing the displacement thereof toward minimum displacement. This provides an upper speed range for the transmission by serving to further increase the speed of the output shaft 14, even though the displacement of the pump remains the same.

The valve 21 also serves to prevent the pressure in the conduit 60 or 61 from exceeding a predetermined value, thus taking the form of a torque multiplication valve as well as a stagging valve. Toward this end, and slidable within the left end of valve 21 is a pressure operated plunger 163 with the right end thereof in engagement with the valve stem piston 140 and the left end thereof exposed to fluid pressure in line 165. Line 165 has branches 165a and 165b connected respectively to the conduits 60 and 61 through check valves 167 and 168, respectively. These check valves provide communication between the high pressure one of the conduits 60 and 61 and the left end of the plunger 163. When the transmission is operating in its upper speed range with the motor at less than maximum displacement with the valve stem 133 moved to the left from its position shown, and the transmission encounters an increase in load and the pressure in conduit 60 or 61 exceeds a predetermined high value, plunger 163 will move to the right against the biasing force of fluid in chamber 157 shifting valve stem 133 toward the low speed position shown, thus serving to increase the displacement of the motor 12. As the displacement of the motor is increased, the torque capability thereof increases reducing pressure in the high pressure one of the main conduits 60, 61 which lowers the pressure in line 165 permitting the valve stem to return to a position where the land 138 blocks flow relatively to line 129 to arrest the cam 33. Thus, this portion of the control maintains the pressure in the high pressure one of the conduits from going above a predetermined value by acting in response to a conduit pressure in excess of that value to increase the displacement of the motor until the pressure in the high pressure one of the conduits returns to the predetermined high value. Thus, the torque multiplication function of the valve 21 serves to maintain a constant horsepower output in the upper speed range of the transmission, assuming a sufficient load is applied to the transmission. If such a load is not applied the motor swashplate under the control of the staging function of valve 21 will move to its minimum displacement position unless the operator moves control handle 19 back toward neutral.

While the operation of the transmission is believed quite clear from the above description it will be summarized briefly as follows. Assuming the operator displaces the control handle 19 to the right, link 96 will shift valve stem 88 to the right pressurizing pump control motor 38 and depressurizing control motor 36 causing clockwise pivotal movement of cam 32. If the control handle is not moved to its maximum displacement position but stopped at some intermediate position, the cam 32 will move to an intermediate position, and through link 96, acting as a feedback link, will return the valve stem 88 toward the left until land 94 blocks conduit 50 locking the pump cam in the intermediate position selected. If, however, the control handle 19 is placed at its maximum displacement position and the valve 18 controls movement of the cam to its maximum position, and the operator thereafter continues movement of the control handle to the right past the maximum position, land 94 will provide fuller communication between line 50 and control fluid line 86 finally raising the pressure in line 50 to full charge pressure.

As the pressure in line 50 approaches full charge pressure, check valve 151 will open applying charge pressure through line 153 against the right side of piston 140 shifting the piston and valve stem 133 to the left reducing the displacement of the motor toward minimum.

If the pressure in conduit 60 increases above a predetermined high value, valve 167 will open and plunger 163 will shift to the right, causing valve stem 133 to move toward the position shown in the drawing increasing the displacement of the motor until the excess pressure is relieved.

The identical operation proceeds during reverse driving of the transmission when the control handle 19 is shifted to the left from neutral, rather than to the right, except that check valve 150 opens when the pump arrives at maximum displacement and check valve 168 controls communication between conduit 61 and plunger 163.

I claim:

1. A hydrostatic transmission, comprising: a variable displacement pump, fluid operable means for varying the displacement of the pump, a variable displacement motor, fluid operable means for varying the displacement of the motor, conduit means for delivering fluid from the pump to the motor, and control means for staging the pump and the motor including a source of control fluid under pressure, first valve means for porting control fluid relative to said pump fluid operable means for varying the displacement of the pump, and second valve means responsive to a predetermined increase in the control fluid pressure for controlling the motor fluid operable means to reduce the motor displacement.

2. A hydrostatic transmission as defined in claim 1, including manually operable means for positioning said first valve means for selecting any desired pump displacement.

3. A hydrostatic transmission as defined in claim 2, wherein said first valve and said pump fluid operable means are sized so that the maximum available control fluid pressure from said source is in excess of that required to hold the pump in maximum displacement, said second valve means controlling said motor fluid operable means to hold said motor in maximum displacement when the pump is less than maximum displacement, said second valve means being responsive to control fluid pressure in excess of that required to hold the pump in maximum displacement for reducing the displacement of the motor toward minimum displacement.

4. A hydrostatic transmission as defined in claim 1, wherein said second valve means is responsive to a predetermined high pressure in said conduit means for increasing the displacement of the motor.

5. A hydrostatic transmission as defined in claim 1, wherein said second valve means selectively ports control fluid to said motor fluid operable means, means biasing said valve to a first position maintaining said motor in maximum displacement, a pressure responsive surface in said valve means communicating with the control fluid supplied to said pump fluid operable means, said biasing means opposing the force of said control fluid pressure acting on said pressure surface and being of sufficient strength to maintain said second valve means in said first position until the control fluid pressure in said pump fluid operable means exceeds a required value to place the pump in maximum displacement, said second valve means moving to a second position when the control fluid pressure exceeds said value, porting control fluid relative to the motor fluid operable means to reduce the displacement of the motor, whereby the displacement of the pump may be increased to maximum and thereafter the displacement of the motor will be decreased.

6. A hydrostatic transmission, comprising: a pump having a rotatable cylinder block, pistons slidable in said cylinder block, and a movable cam member for varying the displacement of the pump, said cam being movable from a neutral position to maximum displacement positions on either side of neutral, pump control motor means for moving the pump cam, a motor having a rotatable cylinder block, pistons slidable in said cylinder block, and a movable cam for varying the displacement of the motor, said motor cam being movable from a maximum displacement position to a minimum displacement position, motor control motor means for moving the motor cam, first and second conduit means interconnecting the pump and the motor, each adapted to operate as either high or low pressure conduits, and control means for varying the displacement of the pump and the motor including a source of control fluid under pressure, first valve means for porting fluid relative to said pump control motor having a valve member movable from a neutral position blocking the flow of control fluid to said pump control motor means to positions on either side of neutral porting fluid to said pump control motor means for selectively moving said pump cam in either direction from neutral, manually operable means for positioning said valve member in any desired position, second valve means for controlling the displacement of the motor including a valve member movable from a first position porting control fluid to said motor control motor means for holding said motor cam in maximum displacement to a second position porting fluid relative to said motor control motor means to reduce the motor displacement, spring means biasing said second valve member to said first position, and means responsive to a predetermined rise in pressure in said pump control motor means for moving said second valve member to said second position thereby reducing the displacement of said motor.

7. A hydrostatic transmission as defined in claim 6, wherein said means responsive to pressure includes piston means formed on said second valve member and defining a fluid chamber in said second valve means, and passage means interconnecting said chamber with the control fluid between the first valve means and said pump control motor means.

8. A hydrostatic transmission as defined in claim 6, including pressure responsive means for increasing the displacement of the motor when the pressure in one of said conduits exceeds a predetermined value.

9. A hydrostatic transmission as defined in claim 8, wherein said conduit pressure responsive means includes piston means formed on said second valve means and defining a fluid chamber in said second valve means, valve means for selectively connecting said fluid chamber to the high pressure one of said first and second conduits, said piston means being arranged to cause movement of said second valve member toward said first position thereof.

10. A hydrostatic transmission as defined in claim 6, further including feedback means between said pump cam member and said first valve member for returning said first valve member to the neutral position when the pump cam arrives at the displacement position corresponding to the movement of said manually controllable means, said first valve means and said feedback means being constructed so that after the pump cam reaches maximum displacement the first valve member may be moved in a direction to port more control fluid to said pump control motor means so that the control fluid pressure in said pump fluid control motor means rises above that value required to hold the pump cam in a maximum displacement position.

References Cited

UNITED STATES PATENTS 2,516,662   7/1950   Vickers et al. _____ 60—53 XR
2,041,365              Carlson et al. _____ 60—53 XR EDGAR W. GEOGHEGAN, *Primary Examiner.*